Figure 1:
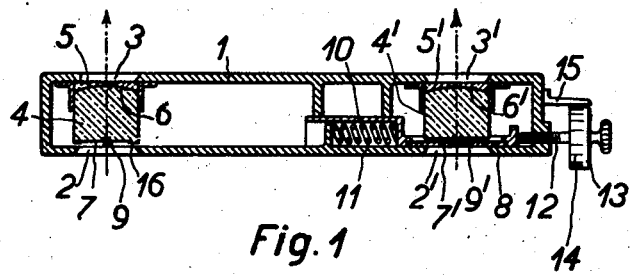

Dec. 18, 1934.   E. WANDERSLEB   1,985,067
STEREOSCOPIC RANGEFINDER FOR PHOTOGRAPHIC PURPOSES
Filed April 5, 1933

Inventor:

Patented Dec. 18, 1934

1,985,067

UNITED STATES PATENT OFFICE 1,985,067

STEREOSCOPIC RANGEFINDER FOR PHOTOGRAPHIC PURPOSES

Ernst Wandersleb, Jena, Germany, assignor to the firm Carl Zeiss, Jena, Germany

Application April 5, 1933, Serial No. 664,647
In Germany April 6, 1932

4 Claims. (Cl. 88—2.7)

It has already been suggested to determine the distance of a photographic object from the photographic camera by means of stereoscopic rangefinders. In these instruments, the observer's two eyes are made to see simultaneously the object in natural size and half-images of a mark which lie at a great apparent distance and, when stereoscopically combined, present the view of one stereoscopic mark image that seems to be at a definite distance, one stereoscopic mark that consists of two half-images being provided in the field of view of the rangefinder for each range.

The invention concerns a rangefinder of the said kind in which not a plurality of marks but one single stereoscopic mark is used whose apparent distance is made to conform to the distance of the object. This idea is carried into practice by providing in the rangefinder one half-image of a mark for each of the observer's eyes and making these half-images appear at a great apparent distance, at least the one of these half-images being displaceable parallel to the rangefinder base in such a manner as to permit an alteration of the apparent distance of the mark the two half-images provide when stereoscopically combined. The rangefinder base may be as great as, smaller or greater than the interpupillary distance of the observer's eyes.

With a view to making the half-images appear at a great apparent distance, collimators may be applied by means of which a half-image lying near the observer's eye may be imaged at a great distance. As is well known, a collimator of this kind consists of a converging optical system, for instance of a converging lens or a concave mirror, and an illuminated mark disposed in the focal plane of this mirror. By known optical means, of which only the plane mirror silvered in part or semi-transparently silvered all over need be mentioned, the path of the imaging rays of the collimator may be so deviated that the half-image appears to lie within that part of the object space which is seen by the eye, if it is not preferred to make the said means deviate the imaging rays emanating from the object space into the direction of the imaging rays of the collimator, which direction coincides with the viewing direction. When using suitable concave mirrors for the collimators, the rangefinder may be so constructed that the image rays emanating from the object space as well as the imaging rays of the collimator strike the eye without previous refraction. The rangefinder may be improved by providing one of the collimators with a diaphragm the view of which is offered to the eye, at the same time as that of a half-image, at a great apparent distance and whose aperture corresponds to the image section reproduced by a certain photographic objective in the image plane of a photographic camera.

To give one of the half-images the necessary movement which, if the corresponding adjustment of the photographic objective is not automatically coupled in a suitable manner, is conveniently transmitted to a device indicating the apparent distance of the stereoscopic mark, either one of the collimator marks may be made movable relatively to the appertaining converging optical system, or the half-image at a great apparent distance relatively to the optical system, in which latter case the collimator mark is to be stationary. A specially simple construction of the instrument is obtained when using the last mentioned method and when, with a view to adjusting the stereoscopic mark to a certain apparent distance, one of the collimators is rotatable about an axis at right angles to its optical axis.

The apparent distance of the stereoscopic mark depends not only upon the distance apart of the two half-images but also on the interpupillary distance of the observer's eyes. Since the interpupillary distances of the eyes of different observers may be very different, it is advisable to provide the rangefinder with a device by means of which the rotatable collimator may be given such an additional rotation about its axis of rotation that the distance apart of the half-images is made to correspond to the interpupillary distance of the observer's eyes. The convergence of the half-images being proportional to the interpupillary distance of the eyes when the stereoscopic mark seems to have an unalterable distance, this additional device permits to provide the instrument with an indicating appliance having a uniform range division. The said device may be used to advantage also with rangefinders whose movable part is coupled to the corresponding part of the objective of the appertaining photographic camera.

Figure 6:
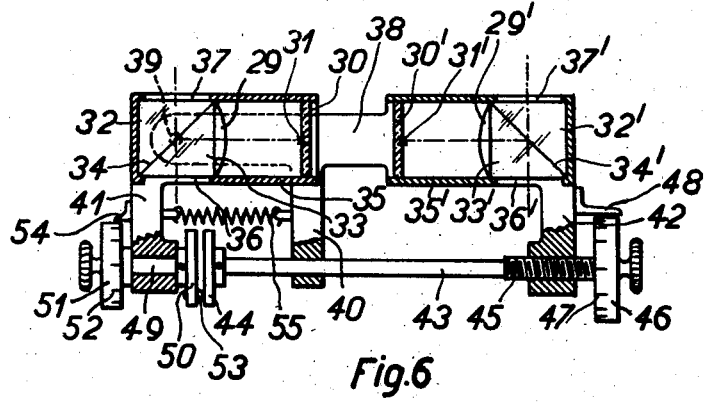

The accompanying drawing represents two constructional examples of the invention. Figure 1 shows in plan view section the first example, a stereoscopic rangefinder in which the interocular distance cannot be varied. Figures 2 to 5 illustrate in cross sections different constructional forms of a single part of this rangefinder. Figure 6 represents in plan view section another constructional example, a stereoscopic rangefinder in which the interocular distance may be varied.

The first constructional example has a housing 1 with ocular apertures 2, 2' and objective apertures 3, 3'. Between each two apertures are disposed glass bodies consisting of plano-convex converging lenses 4 and 4' and plano-concave dispersing lenses 5 and 5', respectively. The curved surfaces of these lenses are semi-transparently silvered and cemented so as to represent glass bodies whose light entrance and exit apertures are plane surfaces parallel to each other. The cemented surfaces 6, 6' represent concave mirrors whose focal planes lie in the plane surfaces 7 and 7' of the lenses 4 and 4', respectively. Between the ocular aperture 2' and the surface 7' is disposed a plano-parallel glass plate 8 whose rear surface, which is quite near the surface 7, is provided with a mark 9'. The glass plate 8 is mounted in a slide 10 that may be displaced at right angles to the viewing direction by means of a screw 12 acting against the pressure of a spring 11. To the screw 12 is fixed a scale 13 having a division 14 which represents ranges and cooperates with an index 15 on the housing 1. At the focus of the cemented surface 6, the surface 7 of the lens 4 has a mark 9. The margin 16 of the surface 7 is varnished so as to be opaque and to represent a diaphragm restricting the image field.

When using the instrument, the objective apertures 3 and 3' are directed upon the object to be photographed, the observer looking into the ocular apertures 2 and 2'. The glass bodies 4, 5 and 4', 5' have the effect of plano-parallel glass plates, as a consequence of which each of the observer's eyes is presented one half-image of the object in natural size, the stereoscopic combination of these half-images representing a stereoscopic image. The marks 9 and 9' are imaged at a great distance by the reflecting surfaces 6 and 6', respectively. If the screw 12 is so adjusted that the mark 9' lies at the focus of the reflecting surface 6', the combination of the two half-images of the mark represents a stereoscopic image whose apparent distance is infinitely great. Therefore, the scale 13 is to be so divided that the index 15 indicates "infinity" on the division 14 when the screw 12 assumes the said position. By turning the scale 13, the slide 10 is displaced against the pressure of the spring 11, the glass disc 8 and the mark 9' being displaced towards the mark 9. The scale 13 is to be rotated until the two half-images of the mark are combined and represent a stereoscopical image whose apparent distance coincides with that of the object to be photographed. This rotation having been effected, the apparent distance of the stereoscopic mark and, consequently, the sought object distance are indicated on the scale 14 by the index 15. The said reflector produces a very distant image also of the diaphragm 16, which, together with the mark 9, lies in the focal plane of the reflecting surface 6, this image being seen simultaneously by the eye at the ocular aperture 2. The diaphragm aperture is restricted in such a manner that the said image so delimits the space surrounding the object as to make the space section correspond to the image section reproduced by the photographic objective on the adjusting plane.

Figures 2, 3, 4, 5:
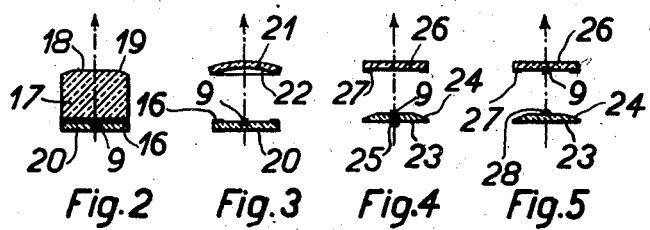

Instead of the glass bodies 4, 5 and 4', 5', the rangefinder may be equipped with other optical systems arranged in a different manner, for instance with systems according to Figures 2 to 5. The system according to Figure 2 is a glass body 17 whose plane bounding surface 18 facing the object has spherical edges 19. These edges 19 are silvered so as to prevent any passage of light and act as a concave mirror whose focal plane coincides with a bounding surface of a plano-parallel glass plate 20 which bears the mark 9 and the diaphragm 16. In the constructional form according to Figure 3, the glass plate 20 is combined with a concave glass reflector 21 whose interior surface 22 is so silvered as to provide a passage only for half the light striking it. The bounding surface of the glass plate 20, which bears the mark 9 and the diaphragm 16, coincides with the focal plane of the reflecting surface 22. In the constructional form according to Figure 4, a plano-parallel glass plate 23 having spherical edges 24 is in front of the eyes. The centre of the glass plate 23 is bored, the bore hole containing a Stanhope magnifier whose diameter is smaller than that of the pupil of a normal eye. A mark 9 is provided on the plane bounding surface of the magnifier 25, which faces the object and lies in the focal plane of the concave bounding surface of this magnifier. In the focal plane of the converging lens represented by the margin 24 lies one bounding surface of a plano-parallel glass plate 26 having a varnished margin 27 representing an image-field diaphragm. The constructional form according to Figure 5 differs from the one according to Figure 4 solely by the glass plate 23 not being bored but having at its centre a small plano-convex lens 28 whose diameter is smaller than that of a normal eye pupil and whose concave surface belongs to the globe which forms the margin 24. In this constructional form of the example, the mark 9 is disposed on the bounding surface of the glass plate 26 which bears the image-field diaphragm 27.

In the constructional form according to Figure 2, the reflecting surface 19, and in the constructional form according to Figure 3 the reflecting surface 22, images the mark 9 and the image-field diaphragm 16 at a great distance. In the case of Figure 2, the object is seen through the surface 18 in natural size, and in the case of Figure 3 through all the surface 22, which is due to the transparent silvering of this surface. In the constructional form according to Figure 4, the converging lens represented by the margin 24 images the image-field diaphragm 27, and the magnifier 25, the mark 9, at a great distance, the view towards the object not being obstructed by the plano-parallel glass plates 23 and 26. In the constructional form according to Figure 5, the converging lens 28 has relatively to the mark 9 the effect of the magnifier 25, the imaging process being the same in all other respects.

In the second constructional example (Figure 6), collimators are used which have converging lenses 29 and 29'. To the lens 29 belongs a frosted disc 30 having a mark 31, and to the lens 29' a frosted disc 30' having a mark 31'. The lenses 29 and 29' are cemented to cubes consisting of two triangular prisms 32, 33 and 32', 33', respectively. The hypoteruse surfaces 34 and 34' of the triangular prisms are semi-transparently silvered. The cube 32, 33, the lens 29, and the frosted disc 30 are mounted in a housing 35, and the cube 32', 33', the lens 29' and the frosted disc 30', in a housing 35'. The housing 35 has an ocular aperture 36 and an objective aperture 37. Corresponding apertures in the housing 35' are denominated 36' and 37', respectively. The lenses 29 and 29' are provided on the cube surfaces facing each other. The housing 35' has an arm 38 in which is provided a bearing for a pin 39 in the housing 35. The arm 38 has a bracket 40, the housing 35 a bracket 41, and the housing 35' a bracket 42. In the bracket 40 is mounted a shaft 43 which has at its one end a disc 44 and at its other end a thread 45 and a disc 46 with a division 47 representing ranges. The thread 45 engages a corresponding female thread in the support 42. This support 42 is provided also with an index 48 cooperating with the division 47. In the support 41, a bolt 49 is rotatable about an axis coinciding with that of the shaft 43. Opposite the disc 44, this bolt has an equal disc 50, and at its other end it is provided with a disc 51 having a scale 52 divided to represent interpupillary distances. On the disc 50 is disposed an eccentric ear 53. The division 52 cooperates with an index 54 mounted in the bracket 41. The brackets 40 and 41 are interconnected by means of a tension spring 55. This spring 55 effects that the ears 53 remain in touch with the disc 44, that is to say that the housing 35 rotates about the pin 39 when the shaft 43 is rotating and, owing to the thread 45, consequently imparts to the disc 44 a longitudinal displacement.

The scale 52 is to be so divided that, when the index 48 is adjusted to "infinity" on the scale 47, the index 54 indicates on the scale 52 the normal interpupillary distance which corresponds to the rangefinder base when the ear 53 has a medium distance from the pin 39. The ear 53 is to be adjusted to such a height that the optical axes of the lenses 29 and 29' and the marks 31 and 31' lie in one straight line when the said adjustment of the discs 51 and 46 is effected. By turning the bolt 49, the scale 51 and the disc 50 in such a manner that the ear 53 is given a smaller or greater distance from the pin 39, it is attained that equal rotations of the shaft 43 entail greater or smaller rotations of the housing 35 about the pin 39. As the combination of the half-images of the marks 31 and 31', which are imaged by the lenses 29 and 29' at a great distance, provides stereoscopic images whose apparent distances are proportional to the interpupillary distance, an observer whose eyes have a small interpupillary distance sees the stereoscopic mark image nearer than it would appear to an observer whose eyes have a great interpupillary distance. For this reason, when the distance of the ear 53 from the pin 39 is greater or smaller than the one corresponding to the normal interpupillary distance, the index 54 is to indicate on the scale 52 a corresponding interpupillary distance. When a distance is to be measured by means of the rangefinder, the scale 51 is to be rotated, the housing 35 being given an additional rotation, until the index 54 indicates on the scale 52 the interpupillary distance of the observer's eyes. This adjustment having been effected, the observer looks through the ocular apertures 36 and 36' to the object and turns the disc 46 until the stereoscopic mark image due to the combination of the two half-images appears to lie at the same distance as the object. When the shaft 43 assumes this position, the index 48 indicates the sought distance:

I claim:

1. A stereoscopic rangefinder for photographic purposes, consisting of a housing, this housing having two viewing apertures whose distance apart in the direction of the base of the rangefinder corresponds to the observer's interpupillary distance, two collimators, one mark disposed in the focal plane of each collimator, the said collimators being so coordinated to the viewing apertures of the rangefinder that one of the said marks is imaged in each viewing aperture at an infinitely great distance, one of the collimators being so mounted in the rangefinder as to be rotatable about an axis at right angles to its optical axis, and means for rotating the said collimator about the said axis.

2. In a stereoscopic rangefinder according to claim 1, means for varying the ratio of transmission between the said means for rotation and the said collimator.

3. A stereoscopic rangefinder for photographic purposes, consisting of a housing, this housing having two viewing apertures whose distance apart in the direction of the base of the rangefinder corresponds to the observer's interpupillary distance, two collimators, one mark disposed in the focal plane of each collimator, the said collimators being so coordinated to the viewing apertures of the rangefinder that one of the said marks is imaged in each viewing aperture at an infinitely great distance, those parts of the said collimators which cover the said viewing apertures having the effect of plano-parallel glass plates with respect to the viewing ray pencils, at least one of the said two marks being displaceable, and means for producing such a displacement of this mark as to displace the image of this mark at an infinitely great distance parallel to the base of the rangefinder.

4. In a stereoscopic rangefinder according to claim 3, one of the said marks being so disposed in the focal plane of one of the collimators that a stationary mark image is reproduced at an infinitely great distance in the viewing aperture coordinated to the said one collimator, and a diaphragm provided in the focal plane of the said one collimator, the image of the said diaphragm restricting that section of the object which is visible in the viewing aperture.

ERNST WANDERSLEB.